Oct. 30, 1956  P. F. M. GLOESS  2,769,167
ELECTRIC SIGNALLING SYSTEMS BY MEANS OF
POSITION MODULATED PULSES
Filed Feb. 1, 1950  5 Sheets-Sheet 3

Inventor:
P. F. M. GLOESS
by: Samuel Selowitz
Attorney

ELECTRIC SIGNALLING SYSTEMS BY MEANS OF POSITION MODULATED PULSES

Paul Francois Marie Gloess, Paris, France

Application February 1, 1950, Serial No. 141,728

13 Claims. (Cl. 343—13)

The present invention relates to the transmission at a remote point of the position of moving objects or similar purposes, by means of electric pulses modulated in position and is more particularly intended to be used in remote measuring and remote control operations. These remote operations are secured by means of recurrent pulses designated as origin or reference signals, which correspond to a determined position of the object or are in a fixed time relationship with this position, and of pulses presenting a variable time delay with respect to the origin pulse. These time modulated pulses, designated as position signals, characterize the position variable in time to be transmitted and reproduced at a remote point. In the systems of radio-location, the said origin signals are generally formed by the pulses scanning the space and corresponding to the zero distance, and the said position signals are formed by the echoes. In the remote measuring systems, the position signals correspond to the different positions taken by the moving part of a metering device, and the origin signals are in a fixed time relationship with a determined indication of the meter and may namely precede by a fixed time interval its zero-position reading. When transmitted through a single channel, the origin signals will be given a particular characteristic shape allowing to filter them out at the receiver, and they will therefore differ from the position signals either by their duration, or their composition, or amplitude, or polarity and so on.

At the receiving station, the delay between the origin and position signals is reproduced by means of a moving device the position of which corresponds to this delay. Generally a cathode ray tube is used for this purpose, the mobile beam of which is synchronized with the origin signals and the position of which is observed on the fluorescent screen, but with this apparatus, the measuring precision depends upon the supply conditions and is not always satisfactory moreover, in certain cases its utilization is impeded by the fragility and volume of the tube and the reading operation is perturbed by the lighting conditions of the place where it is located. Finally, this tube is not suitable for a direct mechanical action and its use is limited only to observing and eventually to photographic recording purposes.

This invention has for its principal object a new method and improved systems and apparatus, making possible the reproduction of the position automatically by means of a material moving body, the position of which is automatically regulated according to the delay between the position and origin signals and which moves in synchronism with the moving part of the transmitter. This result is secured by using an apparatus of relatively simple design and sturdy construction operating reliably and with precision, presenting relatively few inertia effects and therefore highly suitable for transmission at a high rate.

Another object of the invention is to provide an automatic or servo-system comprising a motor which is automatically regulated so as not only to maintain it in synchronism with the received position signal, but moreover to secure the automatic search for said position signal no matter what the initial motor position and the initial signal timing may be.

The invention has also for its object simplified and reliably working embodiments of the said system, securing selective reception and reproduction of several position signals transmitted on the same carrier and corresponding each to the position of a different body, more particularly intended to reproduce the position of several meters assembled on the same apparatus, such as an airplane, and controlling a single transmitter.

The invention has also for its object an automatic system and apparatus working without friction and enabling the reproduction of the position in a continuous and very accurate manner. This system may use electric meters of an ordinary type, which may be of the same type as those used at the transmitter.

The invention may be applied moreover to remote recording of position, by correspondingly modifying the moving body of the receiver so as to transform it into a recorder. It can also be directly applied to the remote control and any other mechanical automatic action according to the delay between the received signals. This delay may namely correspond to the time interval between the instants of transmitting of the origin pulses and receiving the echoes in the radio-location systems, such as range detectors, altimeters, etc., and the invention presents in all these cases the advantage of allowing not only to observe or read this delay, but to record it and to utilize it for any suitable control action.

According to the method described in this invention, the origin signal is used at the receiver to produce locally a time modulated regulation pulse, presenting a variable delay with respect to this signal. This pulse is compared in time with the received position signal so as to produce a variable error current reacting upon the position of this regulation pulse until its delay will correspond to the delay of the received position signal.

According to one feature of this invention, the origin signal, after being selected, in the case where the transmission is secured through a single channel, is used to produce an electric delayed travelling pulse; the latter is collected by means of a moving coupler associated with and driven by an electric motor the position of which is to be regulated. The action of this coupler gives rise to a local regulation pulse presenting, with respect to the origin signal, a time delay variable with the coupler position. This delay is compared with the delay of the position signal with respect to the same origin signal. The resulting variable error signal is fed back to this motor in such a manner as to stabilize its position, when the regulation and position pulses come into coincidence.

According to another feature of the invention, more particularly suitable for the control of the position of meters and similar devices driven by a motor submitted to a continuous restoring force, the resulting effect of the aforesaid comparison between the timings of the regulation and position pulses with respect to the origin signal, are utilized to feed this motor, so as to create a driving torque balancing this restoring force and to immobilize the coupler when the said regulation and position pulses come into coincidence.

This comparison operation is executed in such a manner as to produce a mean current feeding the motor, to which is given, as long as the regulation pulse remains between the position and origin pulses, a value which determines a torque superior to the restoring force, and this current is reduced, at the instant when the coincidence is realized, to a value securing an equilibrium state between these two forces.

The restoring force may present a continuously increasing character, as in the case of the electric meters equipped with a restoring spring, or it may remain constant, when using a balancing weight. The same restoring or repulsive action may also be secured by a constant supply current of the opposite sign with respect to the driving current.

According to one feature of this method, as long as the regulation pulse will remain between the origin and position signals, the produced error current pulses will be given substantially the same magnitude; and they will be integrated so as to produce a mean driving current; when the regulation pulse will cross and overrun the position signal, the magnitude of said pulses will be reduced to zero, such as by decreasing their width rapidly.

According to another feature of this method, the regulation pulses are compared with a locally generated gate signal of a rectangular form, the leading edge of which is fixed by the origin signal and the trailing edge by the position signal; the aforesaid driving current pulses are produced by superposing of the regulation pulses and this rectangular signal.

According to the preferred embodiment of the invention, the apparatus for carrying into effect the method above referred to comprises essentially: means to separate, when necessary, the said origin and position signals; a delay network such as an artificial transmission line fed by the origin pulses and swept by a coupler associated with and driven by the regulated electric motor, the action of this coupler giving rise to the regulation pulse lagging the origin pulse by a time delay, determined by this instantaneous coupler position; a comparison device comprising first a generator of recurrent electric gate signals, preferably of rectangular shape, the duration of which is determined by the delay to be reproduced, the front edge of which being namely fixed by the origin signal and the rear edge by the position signal, and moreover comprising a mixing device receiving said rectangular signal and regulation pulse and feeding said motor.

The generator of the local regulation pulse, the mixing device receiving the regulation pulse and the gate signal and furnishing the error current which determines the motor driving torque, and the motor itself driving the coupler sweeping the line, form a servo-loop of the involved servo-mechanism.

In order to avoid all frictional effect, and to secure continous and accurate regulation, this coupler will be preferably given a capacitive form, such as by using a moving armature in a direct electrostatic relation with the artificial line.

The said generator of rectangular signal may be realized by means of a triggered relaxation circuit comprising two interacting triode elements, controlled in a suitable manner by the origin and position signals. The mixing device may be realized by means of a multigrid tube, the one grid of which receives said rectangular voltage, the other receiving the regulation pulse and the anode being connected to the motor. This tube is biased so as to supply current only when these two signals are superposed.

Preferably, a circuit of a relatively high time constant will be associated with the supply circuit of the motor, in order to integrate the driving pulses produced by the mixing tube.

In the case of transmission through a single channel, the control grid of the one of the trigger circuit triodes will be connected to the common input terminal, whereas the grid of the other triode will be connected to a device filtering out the origin signals; the trigger circuit will be arranged so that the blocking of one of the triodes starts the other one.

The amplitude and duration of the feeding current pulses furnished by the mixer will be adjusted so as to give to the mean current driving the motor, a value determining a torque substantially higher than the restoring force or at least equal to the latter at the end of the coupler travel.

This coupler may be fastened to the moving armature of a meter, the pointer of which will then reproduce the position of a metering device at the transmitter. The latter may advantageously comprise a similar generator with an artificial transmission line and a moving coupler for producing the position signal. The controlled coupler may also be associated with a recording device, or a remote control device.

The invention has moreover for its object an improved system and apparatus for reproducing at the same time the position of several meters, the signals of which are transmitted by a common carrier, a single origin signal being followed by several position signals, each relating to a particular meter. For this purpose, use is made, according to the invention, of several generators of regulation pulses, the artificial lines of which are connected in series and fed successively by the selected origin signal. Each generator will be connected to a particular mixer-tube so as to supply it with its regulation pulse. A single trigger circuit will receive on the one side the train of transmitted signals, and on the other side it will be submitted successively and in a selective manner, to the action of the origin signal when it arrives, and each time when it has crossed an artificial line. To secure this operation, this trigger circuit will be connected to the input terminals of all artificial lines. One will therefore produce as many rectangular comparison voltages as there are lines, and the coupler of each of them will then reproduce automatically the time interval between the position signal and the origin or reference signal created locally.

The invention has finally for its object a system and apparatus for receiving several position signals transmitted on the same carrier and corresponding each to the position of a different body, each of them being accompanied by a particular origin signal, and this train of signals being associated with a particular distribution signal. A supplementary artificial line utilized for this purpose, is energized by the said distribution signal and distributing successively the origin signals between the different receiving apparatus equipped with their artificial lines and moving couplers. A single trigger circuit controlled by the position and origin signals, produces the rectangular comparison voltages applied to the particular mixer-tubes.

The novel features that I consider characteristic of my invention are set forth in detail in the appended claims. The invention itself, however, both as to its organization and method and advantages thereof, will be best understood from the following description of the several embodiments thereof, when read in connection with the accompanying drawings, in which:

Figure 1:
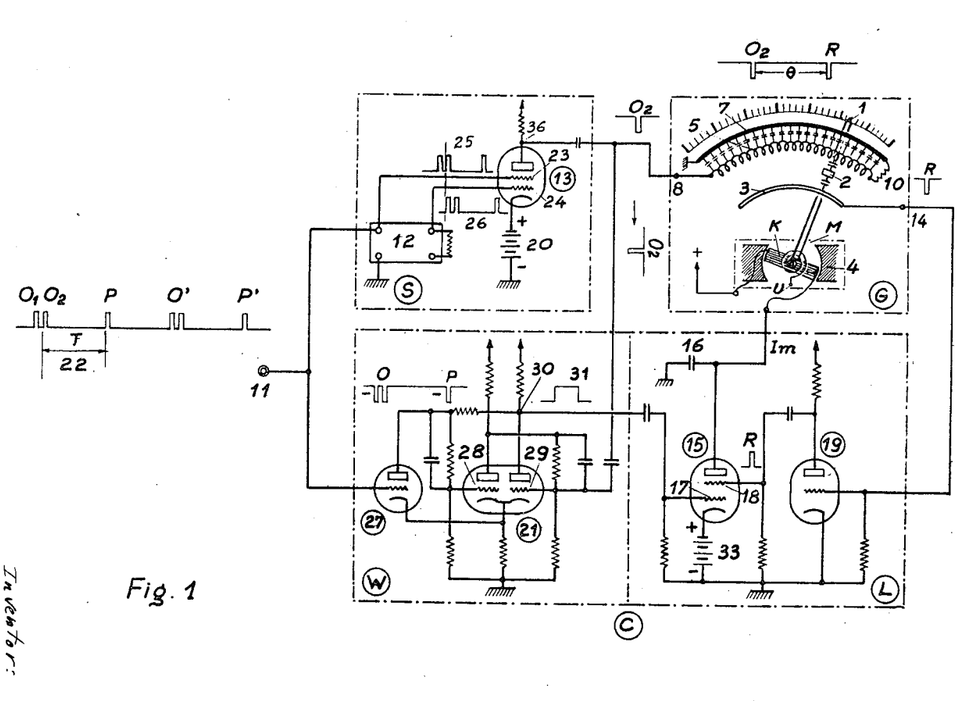
Figure 1 is a schematic plan view with a wiring diagram of the complete receiving apparatus, according to the invention, intended to reproduce, for reading purposes, the position of a single remote moving object, and comprising a generator of regulation pulses with an artificial line, swept by a capacitive coupler.

Referring more particularly to the drawing wherein similar reference characters designate corresponding parts throughout, there is shown in the Figure 1 a block G enclosing an automatically regulated measuring apparatus; a block S enclosing a device selecting the origin signals; a block C enclosing a device securing the comparison in time between the regulation pulses produced by the measuring apparatus G and the incoming position signal. This device comprises two units: one enclosed into the clock W, intended for producing of the rectangular voltage signal, and the other enclosed into the block L used to mix this voltage signal with the regulation pulse and to feed the motor of the apparatus G.

The input terminal 11 of the complete apparatus is connected on the one side to the selector S comprising an electrical delay network 12, such as an artificial line, a mixing tube 13 and a source of bias 20. The same terminal is, on the other side, connected to the device W comprising a tube 27 inverting the polarity of the received signals, and a trigger circuit comprising a twin triode 21, the electrodes of which are interconnected in a known manner so as to secure the relaxation effect. The selector S is connected to the apparatus G comprising an artificial line formed by a helix 5 and a conducting band 7 in a capacitive coupling relation and a capacitive coupler 2 acting as a pick-up, fastened to the pointer 1 and driven by it so as to move between the artificial line and a collecting band shaped electrode 3. This pick-up is made and situated in such a manner as to increase locally substantially the very feeble capacity between these elements. The pointer is driven by a driving mechanism or motor M of a type commonly used in the electric meters and comprising in the illustrated case a moving coil K supplied with a continuous current $Im$. This coil is influenced at the same time by the action of the magnetic field of the inductor 4 and the restoring action of a draw-back spring U. The position of the pointer, observed on a graduated scale, is determined by the equilibrium between the torque due to the supply current of the coil and the restoring force of this spring. The described apparatus is used for generating electric position modulated pulses, the position in time of which is function of the position in space of the pointer. Its construction and operating mode were fully disclosed in my copending United States application Serial No. 75,936, filed February 11, 1949, Patent No. 2,525,893, October 17, 1950.

The moving coil K is connected to the anode of a tube 15, grounded through an integrating or storage condenser 16. This coil is on the other hand, connected in series with the positive pole of the source of the anode supply, not shown, the negative pole of which is also connected to ground. This tube will be preferably of the mixer type with two grids, and its first grid 17 is connected to the point 30 of the trigger circuit W whereas its second grid is connected to the anode circuit of an amplifier tube 19, the grid of which is connected to the collecting electrode 3 of the generator G. The operating mode of this apparatus is a following one: The transmitted pulses are applied to the input terminal 11. They form a train of recurrent periodic origin signals O, O′, etc. followed by position signals P, P′, etc. Each cycle comprises an origin signal of a twin form $O_1$, $O_2$ and a position signal P separated from it by a time interval T characterizing the remote position. It has already been disclosed in the specification of the patent application above referred to, how this twin signal can be generated at the transmitter. It can be admitted that during a relatively short time, this time interval does not change. The train of signals is applied directly to the grid 23 of the tube 13 of the selector device S, and also to its second grid 24 but through an artificial delay line 12. The latter is calculated so as to introduce a delay equal to the distance between two pulses $O_1$ and $O_2$, forming the twin origin signal. The voltages appearing on these grids are illustrated by the diagrams 25 and 26 introduced into the block S. The result is that only the second pulses $O_2$ will be superposed and give rise to a reinforced controlling action sufficient to balance out the blocking action of the bias 20. At the point 36 thus will appear only the voltage pulses $O_2$ of inversed polarity, whereas all other pulses will be blocked. The filtered pulses are applied to the input 8 of the artificial line of the apparatus G. At the same time they are applied to the grid of the right hand triode 29 of the trigger circuit 21 in the device W.

On the other hand, all incoming signals are applied to the amplifier tube 27 of the device W, which inverts their polarity and transmits them to the trigger circuit 21 where they appear on the grid of the left anode 28. It is supposed that, at a given instant, the right hand triode is conducting and the left hand one is blocked. At this state, the negative pulses O and P exert no action on the left hand triode; on the contrary, the filtered pulse $O_2$ appearing on the grid of the right hand triode will block it and start a relaxation effect creating an inversed equilibrium state with conducting left hand triode and blocked right hand one. In this state, the trigger circuit becomes sensitive to the first negative pulse appearing at the terminal 11 immediately after the pulse $O_2$. Thus, it will be the negative signal P which will block the left hand triode and bring back the device to its initial state.

These two successive relaxations will give rise at the point 30 of the anode circuit, to a rectangular voltage gate signal 31, the origin of which will coincide with the second pulse $O_2$ of the origin signal O and the end with the position signal P immediately following it. Its time span will therefore be equal to the time interval T between them. The same successive actions will occur at each transmission cycle O′—P′, etc. and the rectangular voltages appearing at the point 30 will correspond exactly to the transmitted indication.

The filtered out pulse $O_2$ will travel along the artificial line 5 of the generator G with a reduced speed and will be absorbed, without any reflection effect, in the characteristic terminal impedance 10. The capacitive pick-up 2 which is given the form of a metallic vane acting as an intermediate armature, will introduce a substantial capacity between the line and the electrode 3, and acting as a capacitive path transmit to the terminal 14 the delayed pulse collected on the line. The latter will appear there as a negative pulse R. For a given position of the pointer 1, this pulse R will present a certain time lag or delay with respect to the pulse $O_2$ feeding the line, and this lag will vary continuously with the movement of the pointer. If the line helix is wound in a continuous and uniform manner, then the travelling speed of the delayed pulse along it will be constant, and therefore the said delay will be everywhere proportional to the deflection of the pointer. Owing to the direct capacitive relation between the line helix and coupler, any slightest displacement of the latter will be accompanied by a corresponding variation of the delay, thereby securing a continuous response.

The pulse R after its amplification and inversion of polarity by means of the tube 19, is transformed into a positive regulation pulse R applied to the grid 18 of the mixer tube 15. The latter is normally blocked by the bias battery 33 and is unblocked only for the duration of this pulse R and on the condition that the pulse R coincides with the time span of the rectangular gate signal 31 applied to the grid 17 of the tube 15. In such case the tube will give rise to an anode current pulse the duration of which will be determined by the duration and the timing of the regulation pulse and which will feed the moving coil K of the motor M belonging to the apparatus G. Owing to its inertia, the motor will be only sensitive to the continuous component $Im$ of the train of these pulses, on the other hand, the condenser 16, connected to the anode of the mixer tube 15, will derive the alternating components stabilizing thereby the continuous operation of the motor. The circuits of the device L will be chosen so as to give to these pulses an amplitude high enough to produce a continuous component of the current determining a torque substantially superior to the restoring force of the draw-back spring U, as long as the pointer occupies an intermediate position, and at least equal to this force when it reaches the extreme limit of its full deflection.

The artificial line 5—7, the moving pick-up 2, the mixer 15 and the motor coil K driving the pick-up, form a servo-loop producing error current pulses for automatic regulation of the motor.

Figure 2:
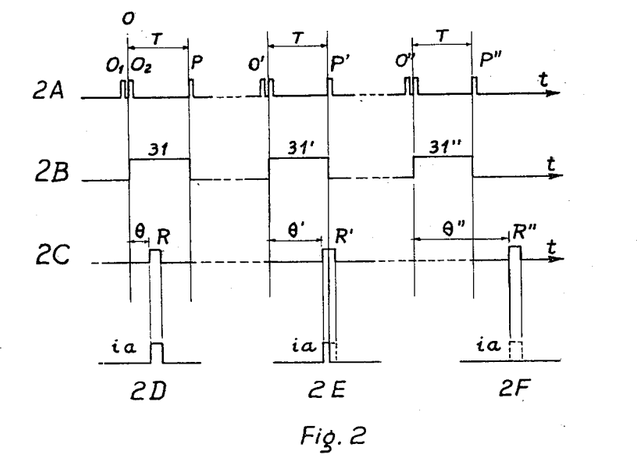
Figures 2, 3 and 4 are the operating diagrams thereof.

The diagrams of the Figure 2, will allow to better understand the operation of the above described servo-mechanism. The diagram 2A represents, with time for base, several cycles of signals applied to the apparatus input, comprising each a twin origin signal $O_1$, $O_2$, $O'$, $O''$, etc. . . ., each followed by a single position signal, P, P', P'', lagging the second pulse $O_2$ by a time interval T. The diagram 2B represents the rectangular recurrent signal 31 at the output of the trigger circuit 21. It is supposed that the interval T remains unchanged during a certain number of cycles and that during this time the pointer moves from left to right along the artificial line, giving rise to the regulation pulses R which will present, with respect to the reference or origin signals $O_2$ feeding the line, a delay O increasing progressively. The graphs 2D, 2E and 2F will then represent the current pulses furnished by the mixer tube 15, corresponding to the different delays of these pulses R.

In the state 2D, the pulse R coincides entirely with a portion of the gate signal 31, the mean current $Im$ resulting therefrom the feeding back the motor is proportional to the product: $ia.\Delta t$, ($ia$ being the amplitude of the driving current pulse, and $\Delta t$ its duration). This mean current is at its maximum and consequently the torque of the motor remains at its maximum value. The deflection of the pointer and hence the delay $\theta$ will increase. In the position 2E the latter becomes $\theta'$, the pulse R' will coincide only partially with the signal 31' and the mean current will drop to a certain value. In the third position represented by the diagram 2F, the pulse R'' will be completely out of the signal 31'' and the current pulse will drop to zero, as will the mean coil feeding current, and the pointer, under the action of the restoring force will try to return back. It is clear that in these conditions, as soon as the position 2E is approached, the motor will be supplied with a mean current which will successively take all intermediate values between maximum (Fig. 2D), and zero (Fig. 2F). The pointer will stop when the driving force due to this current and the restoring force of the spring will balance each other and this condition is fulfilled only when the pulse R' coincides with the pulse P', that is when the delay $\theta'$ created locally between R' and the origin pulse O' becomes equal to the transmitted interval T. Thus the pointer will take automatically and keep an equilibrium position corresponding to and reproducing the transmitted remote position and the latter will be read on the scale. Any accidental change of the pointer position will immediately vary in the opposite sense, the amplitude of the mean driving current, so as to bring the pointer back to its equilibrium position wherein it will remain locked.

Figure 3:
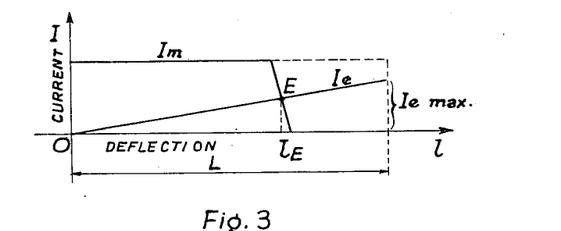

The conditions of this automatic action are shown graphically in Figure 3, wherein $l$ represents the trajectory of the pointer from zero position to full deflection L, and plotted against it $Im$ represents the corresponding variations of the mean motoring error current of the servo-loop.

This diagram is completed by a straight line $Ie$ representing the continuous current necessary to apply to the moving coil in order to balance the restoring force of the spring. It corresponds in the illustrated case to the characteristic calibrating curve of a meter. The current $Im$ remains constant as long as the pick-up moves between zero and the position where the current pulse $ia$ begins to overrun the comparison signal 31, and then it drops in a fast and progressive manner to zero. The point of intersection E of the rear edge of the curve $Im$ with the straight line $Ie$ determines exactly the equilibrium position $lE$ of the pick-up at which it will come to still-stand-still and to which corresponds a local delay $\theta'$ equal to the transmitted delay T.

These diagrams allow the determination of the following fundamental conditions necessary to fulfill in order to secure the wanted automatic regulation:

The mean current fixed by the pulse $ia$ as long as it moves between the signals $O_2$ and $P_1$, and coincides thus entirely with the rectangular gate signal 31, must be at least equal to the current $Ie$ maximum necessary to secure the full deflection.

The minimum delay of the regulation pulse R with respect to the signal $O_2$ must be such that this pulse lags always the beginning of the rectangular signal.

The maximum delay of this pulse R must always let it overshoot the end of the rectangular gate signal.

Instead of decreasing the current pulses $ia$ feeding the motor to zero, it would be sufficient to let them drop to a certain limit value provided that the driving torque they determine does not exceed the restoring force at the beginning of the scale.

Figure 4:
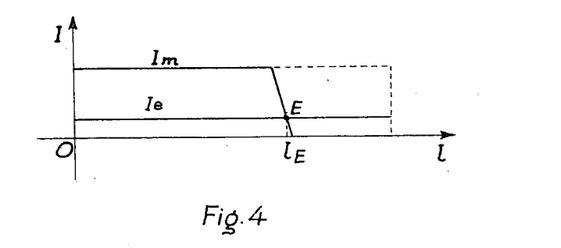

Figure 4 corresponds to the automatic regulation of an electric motor in which the restoring force and hence the calibrating current remain constant; it is represented by a horizontal line parallel to 1 axis. Its intersection point E with the mean current $Im$ curve determines as before the equilibrium position corresponding to the precise synchronization of the regulation pulse with the position signal. Such restoring force may be realized by the force of gravity, such as by using a suitable weight imparting to the motor a balancing torque. In a very practical manner it can also be secured by applying to the motor a continuous and constant driving current of opposite polarity with respect to the mean current of regulation. In the described apparatus it would be sufficient to substitute for the spiral spring U, a continuous current, $Ie$ maximum (Fig. 3), but of inverse polarity, for transmission through the moving coil. Any other suitable means may be used for driving the motor by means of the regulation pulse, provided that the necessary feed-back action between the motor and this pulse lag is secured automatically and according to the conditions above referred to.

Figures 5, 6:
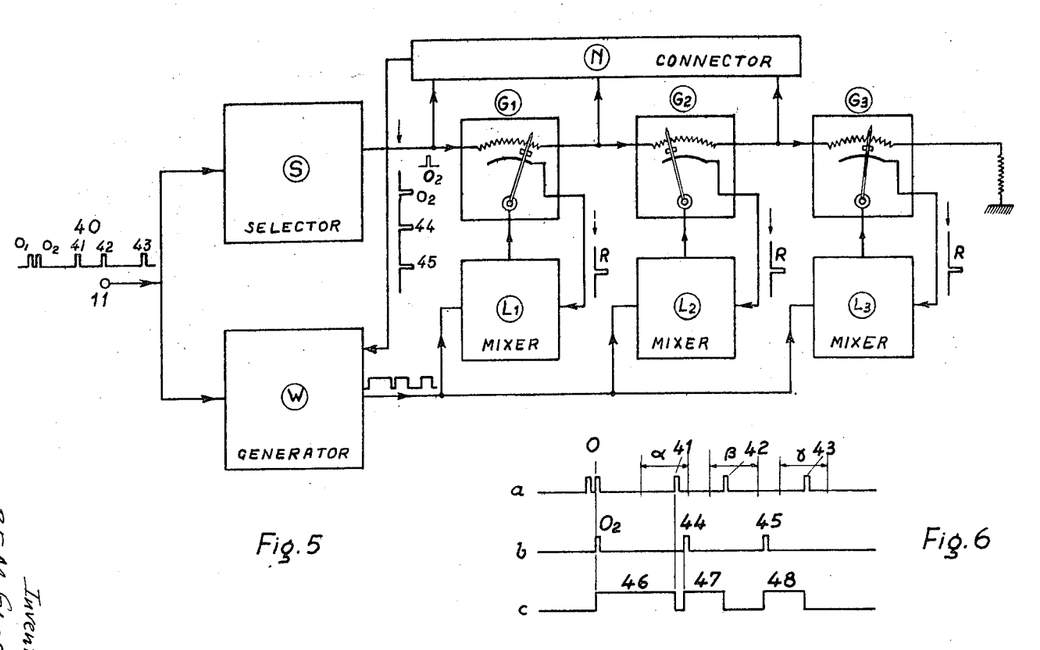
Figure 5 is a block diagram of a modified embodiment of the invention, intended for reception of several position pulses each characterizing the position of a particular remote object, transmitted by a single channel and accompanied by a single origin signal.
Figure 6 is an operating diagram thereof.

In Figure 5, a train of transmitted signals 40 is applied to the input 11, this train comprising, as is represented graphically in Figure 6a, a twin origin signal O and several position signals 41, 42 and 43. The latter characterize the positions of three moving bodies at the transmitter, sent by means of a single carrier. Each position signal can move between the limits of its time-base, respectively $\alpha$, $\beta$ and $\gamma$, corresponding to the full displacement of the moving bodies. Such a transmission may be secured for example by using the system of the Figure 3 of my patent application above referred to, and namely by suppressing the fixed couplings at the beginning of each artificial line belonging to the generators of position modulated pulses, connected in series.

After its selection in the filtering device S, the signal $O_2$ crosses successively the series connected artificial lines of the three controlled metering devices $G_1$, $G_2$ and $G_3$. Each of them is identical to the apparatus G of Figure 1 and its motor is supplied with the mean current from a corresponding mixing device, respectively $L_1$, $L_2$ and $L_3$ arranged and operating as the mixer L in Figure 1. These devices receive, as it was already explained above, the regulation pulses from their respecting generators $G_1$, $G_2$ and $G_3$, moreover they receive the rectangular signals of comparison from a single trigger circuit W, generating three of such signals for each transmission cycle, represented in Figure 6a. This trigger circuit is connected on the one hand to the input terminal 11 and on the other hand to the output terminal of a particular connecting device N to which are linked the inputs of the three aforementioned artificial lines of the apparatus $G_1$–$G_3$. This device contains a network of impedances combined with electronic relays, and it is intended to secure the said connections without short-circuiting the artificial lines and without introducing of perturbing delays. Its realization being well known to those skilled in the art, it is unnecessary to show its details, which would only complicate the drawing.

The filtered signal $O_2$, each time it has crossed an artificial line, will undergo a delay equal to the travelling time constant of the line, which must be at least equal or superior to the intervals, respectively $\alpha$, $\beta$, and $\gamma$; In these conditions, the trigger circuit W will receive successively, through the distributor N, the signals $O_2$, 44 and 45, as represented in diagram 6b. These signals fix respectively the origins of the rectangular gating voltages, 46, 47 and 48, as is represented in diagram 6c, the duration of which is determined respectively by the position signals 41, 42 and 43. The details of this operation were already described in connection with Figure 1. Thereby there is created locally, starting from a single origin signal per cycle containing several independent position signals, a particular rectangular comparison voltage for each metering device. The automatic regulation of the latter is terminated at the moment when the regulation pulse it has generated will coincide with the position signal intended for it. This final state is shown in Figure 5, wherein the pointers occupy equilibrium position determining this coincidence.

Figure 7:
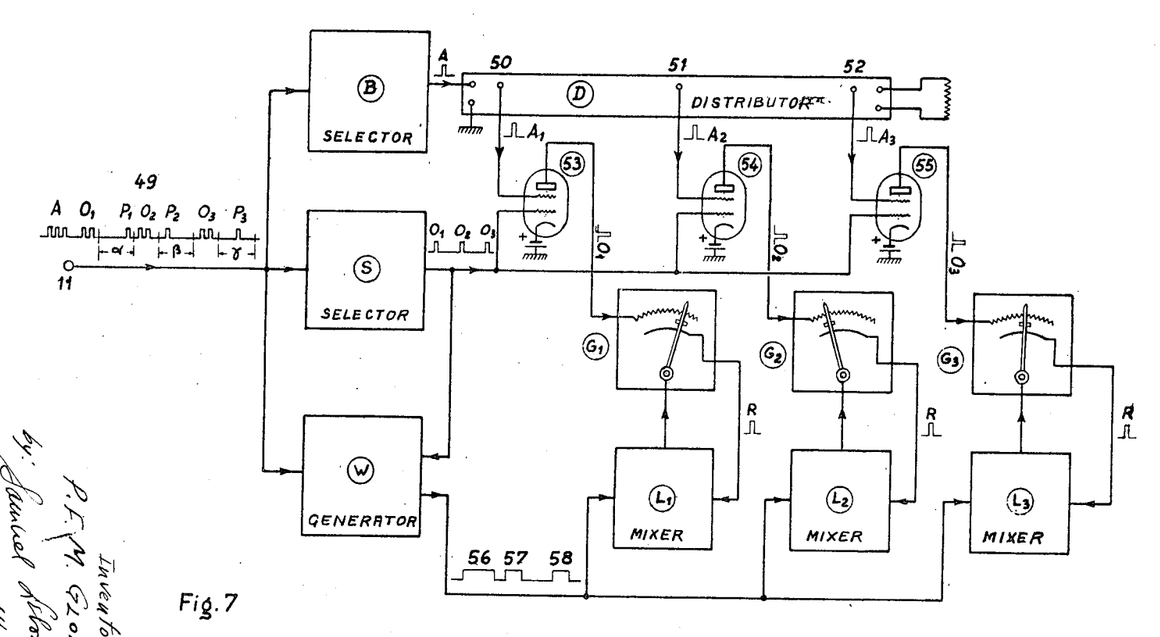
Figure 7 is a block diagram of a further embodiment of the invention intended for the same kind of multiplex transmission, but in which each position signal is associated with a particular origin signal, this train of signals being accompanied by a single distribution signal of a special form.

The embodiment shown in Figure 7 is intended for the selective reception, by means of several automatically regulated metering devices, of a train of signals transmitted through a single channel and wherein each cycle 49 contains as many origin signals $O_1$, $O_2$, $O_3$ and position signals $P_1$, $P_2$, $P_3$, as there are moving bodies at the transmitter, and a single distribution signal A at the beginning of the cycle. Such a transmission may namely be secured by using of the system shown in Figure 3 of my prior patent application above referred to. The arrangement shown in Figure 7 comprises as many combinations of above described generators G and mixers L as there are position signals in a cycle. A single selector S of the twin origin signals and a single trigger-circuit W secure, as it was already described in the present application, the production of successive rectangular voltages 56, 57 and 58. In order to secure the selective comparison of the voltage 56 with the regulation pulse of the measuring device $G_1$, of the voltage 57 with the pulse of the device $G_2$ etc., the energizing of their respective artificial lines is synchronized by the origin signals $O_1$, $O_2$ and $O_3$. For this purpose, use is made of a supplementary selector B, arranged, such as by using the principles involved in the selector S of Figure 1, so as to filter the triple signal A. The latter will then energize an auxiliary artificial line of the distributor D, the taps 50, 51 and 52 of which are connected respectively to one of the grids of tubes 53, 54 and 55, the other grid of which is connected to the selector S furnishing the signals O and the anodes of which lead to the artificial lines of the metering devices $G_1$, $G_2$, $G_3$. These tubes are biased so as to conduct these signals only when they are simultaneously subjected to the distribution pulses $A_1$, $A_2$, $A_3$, respectively, coming from the line D. To secure a correct operation of this arrangement, one needs only to introduce between the taps 50–51 on the one hand, and the taps 51–52 on the other hand, delays equal to the intervals $O_1$—$O_2$ and $O_2$—$O_3$.

The last described embodiment, securing the same result as the preceding one, is somewhat more complicated but on the other hand, it avoids the attenuation of the origin signal owing to its successive travel through several artificial lines in series; moreover, an accidental break in the one of the artificial lines would not stop the operating of the others.

Instead of applying the origin pulse to an end terminal of the artificial line in the generator of delayed regulating pulses and using the moving coupler as a pick-up collecting these pulses, the connection may be inverted. In such case, the coupler will be supplied with origin pulses and act as a moving input, whereas the delayed regulation pulses will be collected at the end terminal of the line. In both cases, the source of supply of origin pulses and the output terminal of the generator where the delayed pulses are collected, will remain connected in series through a variable portion of the line determined by the coupler movement, and the electrical result will remain exactly the same, as the lag of the collected pulse will be always fixed by this portion of the line and hence by the instantaneous coupler position.

Instead of a capacitive coupler, use can be made of a coupler linked magnetically with the field of the line. These two modes of coupling present the advantage of a frictionless operating and they may be therefore driven by a motor of very feeble power such as used in electric meters. Moreover these couplings secure a continuous and progressive time modulation of the regulation pulse and allow therefore to increase the accuracy and the reliability of the operation of the apparatus.

The time interval between the position and origin pulses which the invention develops and uses for any suitable automatic action, may originate from the movement of a mobile body or from the change of size or volume of a fixed body, or from any other modifications of its state which controls a characteristic modulation of the delay between these two pulses. They will be given generally a periodic character, as it was represented in the figures.

The triodes used in the illustrated layouts may be substituted by any other suitable electronic relays, such as screen grid tubes, improving the stability of operation.

The moving coupler was shown in the figures as part of a controlled telemetering device; it may also be associated with a recording device or a remote control device of any kind. The invention may thus be extended to the remote control of the position of a motor driving the coupler, and by using suitable gearing means between them it would be possible to impart to the motor a certain number of revolutions.

The artificial line may be given any shape appropriate to the intended apparatus, such as an arc of a circle for a revolving measuring device, a straight line for a rectilinear movement, a full circle for motor regulation, and so on, provided that this line extends parallel to and near the trajectory of the coupler.

Figure 8:
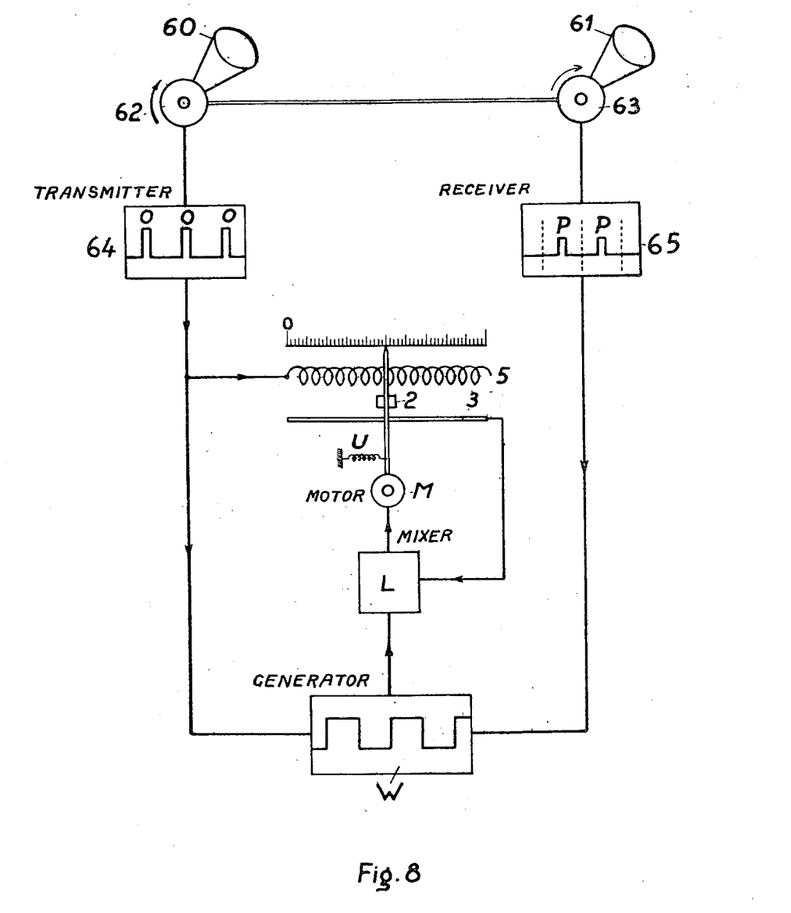
Figure 8 is a schematic view and a wiring diagram of an application of the invention to the radio location of bodies and more particularly to measuring their distance by means of their echoes.

Figure 8 represents the application of the automatic regulation arrangement according to the invention, to the systems of radio detection of ranges by means of echoes. 60 and 61 designate revolving directional antennae such as horns, the first emitting a beam scanning the space and the second receiving the echo of distant objects. The timing oscillator 64 feeds the horn 60 with the scanning pulses O; the same pulses, acting as origin signals, are applied simultaneously to the input of the artificial line 5 and to the device W, generator of rectangular voltage gate signals, which is triggered on the other hand by the echo pulses P received in the horn 61. The regulation pulse collected by the pick-up 2 driven by the motor M and retracted by the draw-back spring U, is compared in the mixer L with these rectangular signals. The resulting mean current feeds the motor and regulates automatically the position of the pointer sweeping a scale, the divisions of which give directly the distance.

The two horns are driven in synchronism by means of interlinked organs 62 and 63. The pick-up may be combined with a recording stylus tracing the locating curve, or it may be associated with a remote control means, the position of which is adjusted to the interval between the signals O and P. In the case of radar arrangements of so called plan-position indicator (P. P. I.) type, the circular recording of the echoes may be secured, by permitting a recording sheet to revolve around the terminal of the artificial line, corresponding to zero distance, taken as center, so that the stylus will trace the ranges in different bearings on the sheet.

I, therefore, particularly point out and distinctly claim as my invention:

1. A system for automatic regulation of position of an electric motor, according to the time interval between a recurrent reference or origin pulse signal, and a position modulated pulse signal, designated position signal, presenting with respect to the origin signal a variable time delay, comprising in combination, an electric motor to be regulated, means for subjecting said motor to a continuous restoring force, an artificial transmission line, means to supply said line with said origin signal only, a coupling means driven by said motor for sweeping said line and producing a recurrent regulation pulse lagging said origin signal by a time interval determined by the instantaneous position of said coupling means, means for comparing electrically the delays of said regulation and position pulses with respect to said origin pulse and for producing thereby motoring pulses driving said motor, means for supplying said comparing means with said origin, position and regulation pulses, said comparing means producing said motoring pulses as long as the regulation pulse drifts within the time span between said origin and position pulses, said motoring pulses determining a driving torque superior to said continuous restoring force, and said motoring pulses disappearing in a rapid and progressive manner when the regulation pulse drifts beyond the position pulse, and means connecting said comparing device to said motor for transforming said motoring pulses into a means continuous current and to supply said motor with said current, so as to drive said motor toward and maintain said motor in an equilibrium position corresponding to the coincidence of said position and regulation pulses.

2. A system as claimed in claim 1 wherein is provided an elongated electrode spacely facing said artificial transmission line with an output terminal for said electrode, said coupling means being formed by an element moving betwen said artificial line and electrode and in electrostatic coupling relation therewith, said coupling means connecting the means supplying the said artificial line with the origin signal and said output terminal whereat appears the regulation pulse through a portion of said artificial line determined by the instantaneous position of said coupling means.

3. A system as claimed in claim 2, wherein said artificial line presents two terminals, the one terminal of the artificial line being conected to the means supplying said line with the origin signal, the other terminal being connected to a matching impedance, and the elongated electrode facing the line being used as a collector leading to the output terminal.

4. In a remote position indicating system, automatically controlled by a recurrent position signal modulated in position with respect to a fixed recurrent origin signal, a regulating loop comprising an electric meter comprising a driving part, a repelling spring connected to said driving part for exerting a restoring action thereon, and a pointer driven by said driving part and sweeping a scale; a device for producing a local regulation pulse comprising an artificial line and a moveable coupler in a continuous electrostatic coupling relation with said line, said coupler being driven by said meter and fixed correspondingly to said pointer, means to supply said line with said origin signal so as to produce a recurrent regulation pulse presenting with respect to said origin signal a delay determined by the position of said coupler, a device controlled by said position and origin signals and generating a rectangular voltage gate signal, the front and rear edges of which coincide with said origin and position signals and the duration of which is equal to the time interval between them, a mixing device receiving said rectangular signal and said regulation pulse to superpose them and to produce actuating current pulses which remain substantially constant as long as said regulation pulse moves inside said rectangular gate signal and which drop rapidly to zero when said regulation pulse overshoots said gate signal, and means connecting said mixing device with said meter and supplying the latter with driving feed-back current, the amplitude of which is determined by the magnitude of said actauting pulses.

5. In a system as claimed in claim 4, said device for generating the rectangular voltage signal comprising a two stage multivibrator triggered circuit, means to reverse the polarity of the incoming origin signal and to apply said reversed signal to the control grid of the one stage of said multivibrator, means to reverse the polarity of the incoming position signal and means to apply said reversed signal to the control grid of the other stage of said multivibrator.

6. In a system as claimed in claim 4, said mixing device comprising a multigrid tube, the one grid of which is connected to the generator of said rectangular voltage signal, and the other grid to the generator of said regulation pulse, and the anode of this tube supplying the meter, said tube being biased so as to furnish current pulses only when said grids are controlled simultaneously.

7. A system for automatic regulation of an electrically driven device according to the time interval between a recurrent origin pulse and a recurrent position pulse presenting with respect to the origin pulse a variable time delay, comprising in combination with said electrically driven device, a delay network, means to supply said delay network with said origin pulse so as to produce therein travelling pulse, means in a capacitive coupling relation with said delay network, said capacitive coupling means being driven by said electrically driven device, so as to sweep said line and to give rise thereby to a recurrent local regulation pulse presenting with respect to said origin pulse a variable time delay determined by the instantaneous position of said coupling means; means to produce an elongated gate signal the length of which is fixed by said origin and position pulses; means to mix said gate signal with said regulation pulse for producing thereby driving feed-back current pulses as long as the position modulated pulse drifts within the gate span, the magnitude of said driving pulses decreasing rapidly to zero when said position modulated pulse does not coincide with said gate signal; and means connecting said mixing means with said electrically driven device for transforming said driving pulses into mean error current and supplying said current to said electrically driven device, so as to shift automatically the regulation pulse towards the trailing edge of the elongated gate signal and maintain said regulation pulse in coincidence with said edge.

8. A system for automatic regulation of an electrically driven device, according to the time interval between a recurrent origin pulse and a recurrent position pulse presenting with respect to the origin pulse a variable delay, comprising in combination with said electrically driven device an artificial line, means to supply said line with said origin pulse, means including an output terminal for collecting a locally generated regulation pulse, a moving coupling means in a direct, continuous electrostatic coupling relation with said line for sweeping said line, said coupling means completing a circuit from said supply means to said output terminal which includes in series a portion of said artificial line determined by the instantaneous position of said coupling means, means for producing an elongated gate signal the length of which is determined by the timings of said origin and position pulses, means to mix said local regulation pulse with said gate signal so as to produce continuously driving current pulses as long as the regulation pulse drifts within the time span of the gate signal, the magnitude of said driving pulses respectively decreasing rapidly to zero when the regulation pulse crosses the position pulse, and means connecting directly said mixing device with said electrically driven device and submitting said last-mentioned device to a driving torque which is a function of the magnitude of said driving pulses.

9. A system for automatic regulation of an electrically driven motor, according to the time interval between a recurrent origin pulse and a recurrent position pulse presenting with respect to the origin pulse a variable delay, comprising in combination with said electrically driven motor a device for producing a local regulation pulse with said origin pulse and comprising a moving part driven by said motor for producing a recurrent regulation pulse lagging said origin pulse by a delay which is determined by the space position of said part, means for comparing the timings of said position and regulation pulses with respect to said origin pulse and for producing thereby continuously motoring feedback pulses of substantially the same magnitude during the entire drift of the regulation pulse within the time span between said origin and position pulses, these feed-back pulses decreasing rapidly in a continuous manner when the regulation pulse crosses the position pulse for and means connected to said comparing means, transforming said motoring feed-back pulses into an unidirectional mean error current and supplying said current to said motor.

10. A system for automatic regulation of an electrically driven device, according to the time interval between a recurrent origin pulse and a recurrent position pulse presenting with respect to the origin pulse a variable time delay, comprising in combination with said electrically driven device a delay network, means to supply said network with the origin pulse so as to produce therein a travelling pulse, means in a capacitive coupling relation with said delay network fixed to and driven by said electrically driven device so as to sweep said line and to give thereby rise to a recurrent local regulation pulse presenting with respect to said origin pulse a variable time delay determined by the instantaneous position of said capacitive coupling means, means to generate an elongated gate signal of variable length, the one edge of which is fixed by said origin pulse and the other edge of which is fixed by said position pulse presenting a variable time delay with respect to said origin pulse, a mixing electronic relay receiving said regulation pulse and controlled by said gate signal so as to be unblocked during the entire time span of said gate signal, said relay producing thereby continuous motoring current pulses during all the drift of the delayed pulse within the gate, the magnitude of said motoring pulses decreasing rapidly when said delayed pulse does not coincide with said gate signal, and means connecting said mixing device with said electrically driven device for transforming said motoring pulses into mean error current and supplying said electrically driven device with said current, so as to shift automatically the regulation pulse towards the position pulse and maintain both pulses in coincidence.

11. A system for automatic regulation of an electrically driven motor according to the time interval between a recurrent origin pulse and a recurrent position pulse presenting with respect to the origin pulse a variable delay, comprising in combination with said electrically driven motor, a device for producing a local regulation pulse supplied with said origin pulse and comprising a moving part fixed to and driven by said motor for producing a recurrent regulation pulse presenting with respect to said origin pulse a variable time delay which is determined by the space position of said part; means to generate an elongated gate signal of variable length, the one edge of which is fixed by said origin pulse and the other edge of which is fixed by said position pulse presenting a variable time delay with respect to said origin pulse, a mixing electronic relay receiving said regulation pulse and controlled by said gate signal so as to be unblocked during the entire time span of said gate signal, said relay producing thereby continuously motoring current pulses during all the drift of the delayed pulse within the gate, the magnitude of said motoring pulses decreasing rapidly when said delayed pulse does not coincide with said gate signal, and means connecting said mixing device with said automatically regulated device for transforming said motoring pulses into mean error current and supplying said automatically regulated device with said current, so as to shift automatically the regulation pulse towards the position pulse and maintain both pulses in coincidence.

12. A system for automatic regulation of position of an electric motor subject to a steady restoring force, according to the time interval between a recurrent origin pulse and a recurrent position modulated pulse presenting with respect to the origin pulse a variable time delay, comprising in combination with said electric motor a device for producing a local regulation pulse supplied with said origin pulse and comprising a moving part fixed to and driven by said motor for producing a short recurrent regulation pulse lagging said origin pulse by a delay determined by the space position of said moving part, means to generate an elongated gate signal of variable length, the one edge of which is fixed by said origin pulse and the other edge of which is fixed by said position pulse, a mixing electronic relay receiving said regulation pulse and controlled by said gate signal so as to be unblocked during the entire time span of said gate signal, said mixing device supplying the motor with driving feed-back current determining a driving torque which exceeds said restoring force as long as said regulation pulse drifts within the time span of said gate signal and which falls to zero when said regulation pulse crosses the edge of the gate signal fixed by the position pulse.

13. In a range detecting apparatus operating by radiation of searching pulses and measuring of the variable time interval between said pulses and the first echo pulse, in combination with means for transmitting searching pulses and means for receiving the echo pulse, a system of automatic regulation of an electric meter acting as a range indicator in a regulating loop comprising a driving part for said meter, a repelling spring connected to said driving part for exerting a restoring action thereon, and a pointer driven by said driving part and sweeping a scale; a device for producing a local regulation pulse comprising an artificial line and a moveable coupler in a continuous electrostatic coupling relation with said line, said coupler being driven by said meter and fixed correspondingly to said pointer; means to supply said line with a searching pulse so as to produce a recurrent regulation pulse presenting with respect to said searching pulse a delay determined by the position of said coupler; a device controlled by said echo and searching pulses and generating a rectangular voltage gate signal, the front and rear edges of which coincide with said searching and echo pulses and the duration of which is equal to the time interval between them; a mixing device receiving said rectangular signal and said regulation pulse to superpose them and to produce actuating current pulses which remain substantially constant as long as said regulation pulse moves inside said rectangular gate signal and which drop rapidly to zero when said regulation pulse overshoots said gate signal; and means connecting said mixing device with said meter and supplying the latter with driving feed-back current, the amplitude of which is determined by the magnitude of said actuating pulses, to indicate the corresponding range on said meter.

References Cited in the file of this patent

UNITED STATES PATENTS

| | | |
|---|---|---|
| 1,671,143 | Campbell | May 29, 1928 |
| 2,382,413 | Hanert | Aug. 14, 1945 |
| 2,422,204 | Meacham | June 17, 1947 |
| 2,467,208 | Hahn | Apr. 12, 1949 |
| 2,471,408 | Busignies | May 31, 1949 |
| 2,525,893 | Gloess | Oct. 17, 1950 |
| 2,539,905 | Herbst | Jan. 30, 1951 |
| 2,617,093 | Fyler | Nov. 4, 1952 |

FOREIGN PATENTS

| | | |
|---|---|---|
| 582,492 | Great Britain | Nov. 19, 1946 |